United States Patent
Welnick et al.

(10) Patent No.: US 7,260,394 B2
(45) Date of Patent: Aug. 21, 2007

(54) USING AN ENHANCED PREFERRED ROAMING LIST IN A TERMINAL DEVICE

(75) Inventors: William E. Welnick, Poway, CA (US); William P. Alberth, Jr., Crystal Lake, IL (US)

(73) Assignee: Motorola Inc., Schaumburg, IL (US)

( * ) Notice: Subject to any disclaimer, the term of this patent is extended or adjusted under 35 U.S.C. 154(b) by 218 days.

(21) Appl. No.: 10/964,182

(22) Filed: Oct. 13, 2004

(65) Prior Publication Data

US 2006/0079224 A1   Apr. 13, 2006

(51) Int. Cl.
*H04Q 7/20* (2006.01)
(52) U.S. Cl. .................. 455/432.1; 455/450; 455/436
(58) Field of Classification Search ............. 455/432.1
See application file for complete search history.

(56) References Cited

U.S. PATENT DOCUMENTS

| | | | |
|---|---|---|---|
| 5,734,980 A * | 3/1998 | Hooper et al. .............. | 455/434 |
| 2003/0083064 A1 | 5/2003 | Cooper | |
| 2004/0192304 A1 | 9/2004 | Casaccia et al. | |
| 2004/0236849 A1 * | 11/2004 | Cooper et al. .............. | 709/224 |

FOREIGN PATENT DOCUMENTS

EP  1 292 169 A2  3/2003

OTHER PUBLICATIONS

Nobuyuki Uchida; "GSM/UMTS PRL Overview"; XP002358638; Nov. 3, 2003; pp. 1-20.
Andrew Hunter; "PRL Enhancements for International Roaming"; XP002358637; Feb. 2004; pp. 1-16.
Andrew Hunter, CDG Workshop; PRL Enhancements for International Roaming; Feb. 2004.
CDMA Development Group; PRL Enhancements For International Roaming; Version 1.0; Apr. 1, 2004; CDG Document 86.
Rotem Cooper; PRL Enhancements for International Roaming; Feb. 2004.
PRL Enhancement Workshop; PRL Enhancements Frequently Asked Questions; Feb. 2004; San Diego.
Nobuyuki Uchida; GSM/UMTS PRL Overview; Nov. 3, 2003.
Perry Laforge; Support for Preferred Roaming List Enhancements for International Roaming; CDG Resolution 2003.2; Dec. 8, 2003.

* cited by examiner

*Primary Examiner*—Nick Corsaro
*Assistant Examiner*—Joel Ajayi
(74) *Attorney, Agent, or Firm*—Sylvia Chen

(57) ABSTRACT

A method (200) in a CDMA terminal device for acquiring a system identified in an enhanced preferred roaming list (enhanced PRL), with at least one entry containing a mobile country code, includes the steps of obtaining (210) system identifiers from SYNCH channels on a scan list, determining (220) if the system identifiers match entries on the enhanced PRL, and inserting (226) channel information items on a first list if the system identifiers do not match entries on the enhanced PRL. If all channels on the scan list have been scanned without any system identifiers matching entries on the enhanced PRL, the method obtains (246) mobile country codes using channel information items from the first list, determines (250) if the mobile country codes match entries on the enhanced PRL, and camps (283) on a system if its mobile country code matches an entry on the enhanced PRL.

20 Claims, 5 Drawing Sheets

|  | 410 | 470 |
|---|---|---|
|  | ENHANCED PRL | AUGMENTED |
| 411 | SID/NID 1010<br>SID/NID 1042<br>SID/NID 1073<br>SID/NID 1077<br>... (ADDITIONAL SID/NIDs) | ✕ |
| 415 | MCC/MNC 043    *416* | SID/NID 4053<br>SID/NID 4067<br>SID/NID 4143   — 476 |
| 415 | MCC/MNC 111 |  |
| 415 | MCC/MNC 245    *418* | SID/NID 8083<br>SID/NID 8739   — 478 |
|  | ... (ADDITIONAL MCC/MNCs) |  |

| 620 | 640 |
|---|---|
| MCC/MNC | LOCATION |
| 043<br>111<br>245<br>... (ADDITIONAL MMC/MNCs) | EUROPE<br>ASIA<br>NORTH AMERICA<br>... |

USING AN ENHANCED PREFERRED ROAMING LIST IN A TERMINAL DEVICE

FIELD OF THE DISCLOSURE

This disclosure relates generally to preferred roaming lists for international roaming in code division multiple access (CDMA) systems, in particular international roaming in cdma2000 and UMTS systems.

BACKGROUND OF THE DISCLOSURE

The current way that roaming partners and their network systems are being identified to CDMA subscriber devices is becoming unwieldy. A CDMA service provider uses system identifiers (SIDs) and optional network identifiers (NIDs) to support expansion of its CDMA network. Each SID covers a geographic area about the size of a city or large town. A NID is an optional subdivision of a SID and can identify different toll areas, rating areas, private networks, or any other subdivision a network operator may want to distinguish within a SID. A network operator may have hundreds of SID/NIDs identified in its network. A roaming partner needs to be able to store all those SID/NIDs in a preferred roaming list (PRL). This PRL is then communicated by the roaming partner network to its CDMA terminal devices and stored on the CDMA terminal devices of the roaming partner.

As SID/NIDs are changed or added on a CDMA network, roaming partners need to update their PRLs with the new SID/NIDs. The rate of introduction of new SID/NIDs has increased rapidly as CDMA carriers around the world expand and upgrade their networks. A nationwide or multi-national service provider may have many hundreds of SID/NIDs identified in its CDMA network and be continually changing its SID/NID listing.

While PRLs are getting larger, the memory available to store PRLs on a CDMA terminal device is potentially getting smaller. CDMA carriers that provide Removable User Interface Modules (RUIMs) as PRL storage space must deal with the fact that RUIMs have significantly less storage space for PRLs than non-RUIM terminal devices.

With increasing PRLs and decreasing PRL storage space, the CDMA Development Group has proposed enhancements to the PRL that will allow roaming partner networks to be identified by Mobile Country Code (MCC) and/or Mobile Network Code (MNC or IMSI_11_12) in addition to SID/NID. An advantage to this approach is that a large number of SID/NIDs in a PRL can be replaced by a single MCC/MNC in an "enhanced PRL." Thus, by including MCC/MNCs in an enhanced PRL, the many SID/NIDs that are superseded by a single MCC/MNC can be eliminated.

A drawback to the MCC/MNC approach, however, is that it currently takes a CDMA terminal device up to two seconds to obtain MCC/MNC information from overhead channels being broadcast by a CDMA network. Thus, there is an opportunity to optimize a CDMA terminal device to handle MCC/MNC enhanced PRL entries to spend less time obtaining MCC/MNC information from overhead channels. The various aspects, features and advantages of the disclosure will become more fully apparent to those having ordinary skill in the art upon careful consideration of the following Drawings and accompanying Detailed Description.

BRIEF DESCRIPTION OF THE DRAWINGS

FIG. 4 shows an augmented enhanced preferred roaming list for use with the second embodiment.

FIG. 6 shows an MCC/MNC Location table for use with the third embodiment.

DETAILED DESCRIPTION OF THE PREFERRED EMBODIMENTS

A method in a CDMA terminal device for acquiring a system identified in an enhanced preferred roaming list (enhanced PRL), with at least one entry containing a mobile country code, includes the steps of obtaining system identifiers from SYNCH channels on a scan list, determining if the system identifiers match entries on the enhanced PRL, and inserting channel information items on a first list if the system identifiers do not match entries on the enhanced PRL. If all channels on the scan list have been scanned without any system identifiers matching entries on the enhanced PRL, the method obtains mobile country codes using channel information items from the first list, determines if the mobile country codes match entries on the enhanced PRL, and camps on a system if its mobile country code matches an entry on the enhanced PRL.

This method exploits the assumption that obtaining a system identifier for a channel takes less time than obtaining a mobile country code for a channel. Currently, obtaining a system identifier for a channel takes tens of milliseconds while obtaining a mobile country code for a channel takes seconds. Thus, system identifiers are first obtained for matching to an enhanced PRL. Mobile country codes obtained for matching to an enhanced PRL only after system identifiers are found to not match to the enhanced PRL.

Creating an augmented enhanced PRL, where system identifiers not on the enhanced PRL are linked to mobile country codes on the enhanced PRL, allows a terminal device to quickly find system identifiers that are not on the enhanced PRL but are likely to match to a mobile country code on the enhanced PRL. Then, the mobile terminal can take the time to acquire the mobile country codes for those likely channels before acquiring mobile country codes for other, less likely, channels.

Also, knowing the geographic location of the terminal device, even very coarsely such as by continent, can assist a terminal device with an enhanced PRL in quickly camping on a system. The terminal device prioritizes the acquisition of channels that correspond to mobile country codes in the enhanced PRL that cover the geographic location of the terminal device.

Thus, by prioritizing the acquisition of identifiers, such as system identifiers and mobile country codes, according to the time it takes to acquire the identifiers and the likelihood of the identifier being on the enhanced PRL, a terminal device can more quickly camp on a system while it is roaming internationally.

Figure 1:
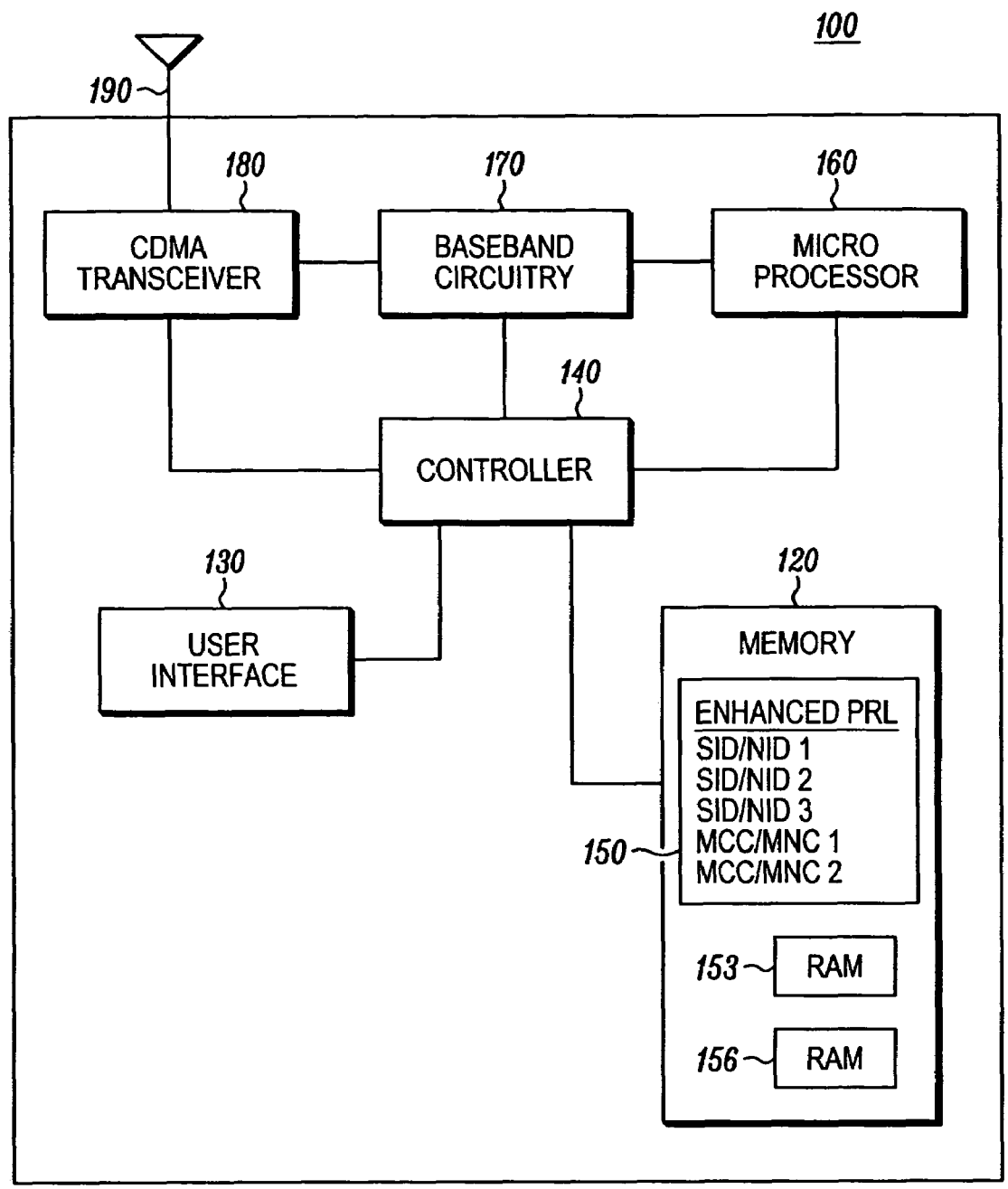
FIG. 1 shows a block diagram of a terminal device for using an enhanced preferred roaming list according to the embodiments shown in FIGS. 2-6.

FIG. 1 shows a block diagram of a terminal device 100 using an enhanced preferred roaming list (enhanced PRL) 150 for international roaming according to the embodiments. The terminal device 100 in the embodiments is a CDMA cellular telephone. Alternate terminal devices, such as cellular modems, personal digital assistants (PDAs) with wireless interfaces, and other devices using CDMA radio access technology can be substituted for the CDMA cellular telephone shown. The terminal device 100 includes an antenna 190, a CDMA transceiver 180, baseband circuitry 170, a microprocessor 160, a controller 140, and a user interface 130 that includes components such as a keypad, a display, a loudspeaker, and a microphone.

Additionally, memory block 120 stores an enhanced PRL 150 that contains at least one MCC/MNC entry and may contain SID/NID entries. The memory block can be implemented as a memory that is not intended to be removed from the terminal device 100 (such as a User Interface Module (UIM)), as a Removable User Interface Module (RUIM), or as another type of memory unit. Other memory in the memory block 120 can include random access memory (RAM) 153 and read-only memory (ROM) 156.

Currently, an MCC/MNC is obtained from an Extended System Parameter Message (ESPM), which is an overhead message transmitted periodically on a paging channel. A paging channel is not acquired, however, until after a SYNCH channel is acquired. Thus, it may take up to two seconds for a terminal device to acquire a SYNCH channel, acquire a paging channel, obtain the ESPM overhead message, and extract the MCC/MNC from the ESPM for comparison with an enhanced PRL. If there is no match between the acquired MCC/MNC and the enhanced PRL, the terminal device must again go through the process of acquiring a SYNCH channel, acquiring a paging channel, obtaining the ESPM overhead message, and extracting the MCC/MNC from the ESPM overhead message. If an MCC/MNC match is not obtained on a first or second attempt, the delay in system acquisition can become unacceptable to a user of the terminal device.

One way to solve the problem of a long acquisition time for an MCC/MNC is to place MCC or MCC/MNC data directly into the SYNCH channel. Then, the terminal device only needs to acquire the SYNCH channel, extract the MCC or MCC/MNC information, and compare it to a system table portion of the enhanced PRL. In the situations where MCC or MCC/MNC information cannot be quickly acquired, following are three embodiments for improved system acquisition using an enhanced PRL having at least one MCC/MNC entry.

Figure 2:
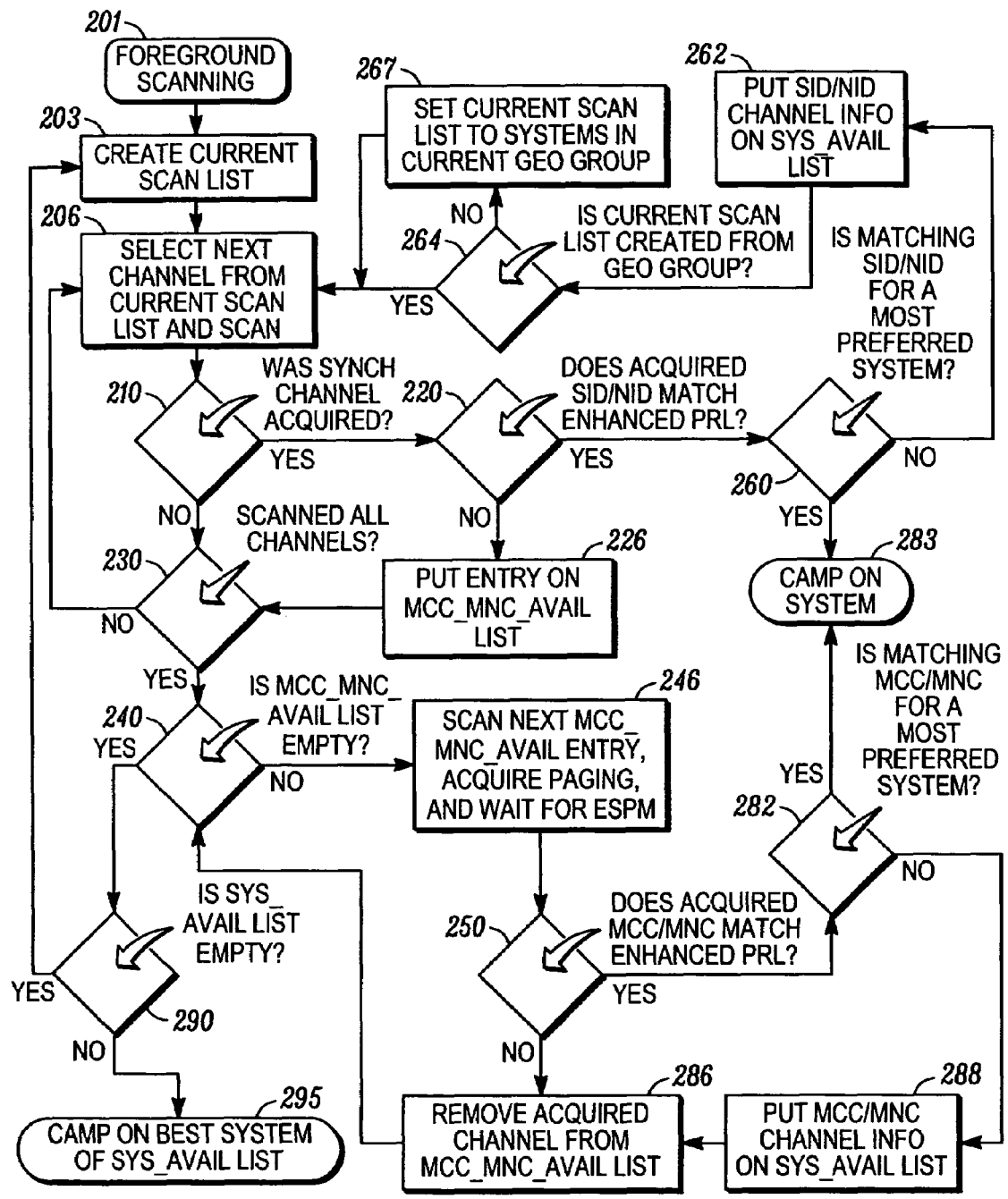
FIG. 2 shows a flowchart for using an enhanced preferred roaming list in a terminal device according to a first embodiment.

FIG. 2 shows a flowchart 200 for using an enhanced PRL in a terminal device for international roaming according to a first embodiment. This flowchart 200 can be implemented using software in the microprocessor 160 of the terminal device 100 shown in FIG. 1. This flowchart 200 implemented in the microprocessor 160 interacts with an enhanced PRL 150, a scan list in a memory 120, and a receiver in the CDMA transceiver 180.

The flowchart 200 starts in step 201 with foreground scanning by the receiver in the CDMA transceiver 180 (shown in FIG. 1). During foreground scanning, the terminal device 100 has not acquired an acceptable system, as defined by a system table portion of the enhanced PRL 150, and is scanning for an acceptable system to acquire. Step 203 obtains a current scan list from one or more scan lists in the memory 120 of the terminal device 100. A scan list contains channel frequencies in order of priority (e.g., home networks, then preferred networks, then roam networks, then other networks). A current scan list can be created from an acquisition table portion (not shown) of the enhanced PRL 150. A terminal device may have multiple PRLs, and a user can manually select a PRL through the user interface 130 shown in FIG. 1 or the terminal device 100 will use a default PRL without user intervention.

Next, step 206 selects a channel from the current scan list and the CDMA transceiver 180 (shown in FIG. 1) scans the specified channel frequency. Generally, scan lists are ordered according to a priority. The first channel selected is the most desirable channel and subsequent loops through step 206 descend through the priority order. Step 210 determines whether a SYNCH channel was acquired during the scanning in step 206.

If a SYNCH channel was acquired, step 220 determines if a SID/NID included on the acquired SYNCH channel matches a SID/NID entry on a system table portion of an enhanced PRL 150 (shown in FIG. 1). If there is a SID/NID match, step 260 checks if the matching SID/NID is for a most preferred system according to a GEO group in the enhanced PRL. A GEO group is a logical group of systems within the system table portion of the enhanced PRL. GEO is short for geographic area. Systems that are known to be in a particular geographic area (i.e., co-located) are placed in the same GEO group in the PRL. Additionally, systems within each GEO group can have different priority levels. The highest priority systems are called "most preferred" (typically home systems), and any lower than "most preferred" are "less preferred" (typically roam systems). If the system is most preferred, then step 283 camps on the acquired system. This sequence of steps, starting at step 201 and going to steps 203, 206, 210, 220, 260, and finally to step 283, allows for quickly camping on a system when an enhanced PRL's system table includes SID/NIDs, such as current SID/NID-only CDMA PRLs and enhanced CDMA PRLs containing both SID/NID entries and MCC/MNC entries.

If the acquired system is not a most preferred system according to the GEO group in the enhanced PRL and determined by step 260, step 262 places channel information for the acquired system, such as frequency and band, on a SYS_AVAIL list. Next step 264 determines if the current scan list (obtained at step 203) was obtained from the GEO group in the enhanced PRL. If the current scan list was obtained from the GEO group, the flow returns to step 206 to select a next channel from the current scan list. If the current scan list was not obtained from the GEO group, step 267 obtains a (new) current scan list that includes channels from the GEO group. Then, when the flow returns to step 206, the first channel from the (new) current scan list is selected. If the foreground scanning step 201 occurs when the terminal device 100 first powers up, the current scan list will include all the channels on the acquisition table of the enhanced PRL. After the terminal device 100 finds a system that is listed in a system table of the enhanced PRL, the scan list may change to direct scanning only for channels that match that GEO group's systems. Then, if a system is subsequently lost, the scan list will already be set to scan only for systems in the GEO group.

Returning to step 220, if the SID/NID from the acquired SYNCH channel does not match a SID/NID entry on a system table of the enhanced PRL 150 shown in FIG. 1, step 226 inserts channel information, such as frequency and band of the acquired channel, on an MCC_MNC_AVAIL list. Next, step 230 determines if all channels on the current scan list have been scanned. (If step 210 determines that no SYNCH channel was acquired during the scanning in step 206, the flow also goes to step 230.) If not all channels on the current scan list have been scanned, the flow returns to step 206 to select the next channel from the current scan list and proceed as previously described.

If step 230 determines that all channels on the current scan list have been scanned (and no SID/NID on an acquired SYNCH channel matches a most preferred SID/NID entry on a system table of the enhanced PRL), then step 240 determines whether the MCC_MNC_AVAIL list is empty. If step 240 determines that the MCC_MNC_AVAIL list is not empty, step 246 scans the first channel on the MCC_MNC_AVAIL list. Note that this SYNCH channel was recently acquired during step 210. Step 246 then acquires the related paging channel and receives the Extended System Parameter Message (ESPM), which is an overhead message transmitted periodically on a paging channel.

Step 250 determines whether the MCC/MNC from the paging channel ESPM matches an MCC/MNC entry in a system table of the enhanced PRL. If there is no MCC/MNC match, step 286 removes the acquired frequency channel from the MCC_MNC_AVAIL list, and the flow returns to step 240. If there is an MCC/MNC match, step 282 determines if the matching MCC/MNC is for a most preferred system. If the matching MCC/MNC is for a most preferred system, then step 283 camps the terminal device on the acquired MCC/MNC system. If the matching MCC/MNC is not for a most preferred system, channel information is put on the SYS_AVAIL list at step 288, and step 286 removes the acquired channel from the MCC_MNC_AVAIL list before returning to step 240.

If step 240 determines that the MCC_MNC_AVAIL list is empty, step 290 determines if the SYS_AVAIL list is empty. If the SYS_AVAIL list is not empty, then step 295 camps the terminal device on the highest priority system on the SYS_AVAIL list. This system could be identified through either SID/NID via step 262 or MCC/MNC via step 288. If the SYS_AVAIL list is empty, then the flow begins again at step 203 with a new current scan list that includes all the channels on the acquisition table of the enhanced PRL.

If an acquired SID/NID is not on a system table of the enhanced PRL, as determined by step 220, step 226 uses an MCC_MNC_AVAIL list to record and prioritize frequency channels where the terminal device should take the time to acquire an MCC/MNC. If any SID/NID or MCC/MNC matches are not for a most preferred system, step 262 and step 288 create a SYS_AVAIL list to keep track of acquired systems that are not most preferred. Then, if a most preferred system is not acquired, step 295 can select a best less preferred system from the SYS_AVAIL list.

Because a SYNCH channel, which contains a SID/NID, can be acquired in tens of milliseconds, this method for using an enhanced PRL for international roaming takes advantage of the quick SID/NID acquisition time and also takes advantage of the assumption that system tables of enhanced PRLs will include SID/NID entries in addition to MCC/MNC entries. Only if there are no SID/NID matches will the method resort to acquiring MCC/MNC information from a paging channel. Acquiring MCC/MNC information is deferred until after all available SID/NIDs are checked, because acquiring a SID/NID only requires tens of milliseconds while it may take up to 2 seconds to acquire an MCC/MNC.

Figure 3:
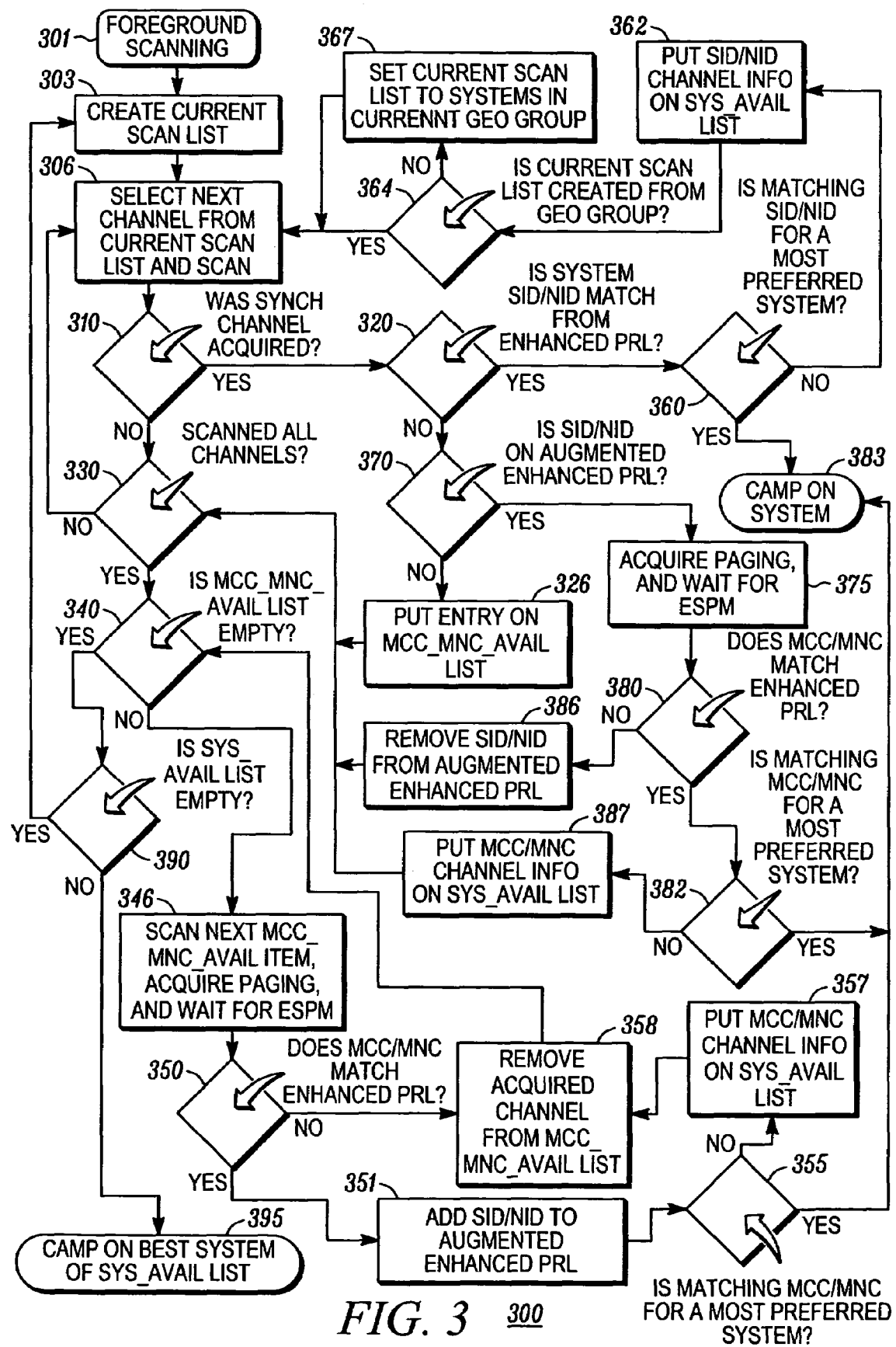
FIG. 3 shows a flowchart for using an enhanced preferred roaming list in a terminal device according to a second embodiment.

FIG. 3 shows a flowchart 300 for using an enhanced PRL in a terminal device for international roaming according to a second embodiment. This flowchart 300 can be implemented using software in the microprocessor 160 of the terminal device 100 shown in FIG. 1. This flowchart 300 implemented in the microprocessor 160 interacts with an enhanced PRL 150, a scan list in a memory 120, and a receiver in the CDMA transceiver 180. Instead of merely checking whether acquired SID/NIDs or MCC/MNCs match to a system table of an enhanced PRL at the time of acquisition, this flowchart 300 maps acquired SID/NIDs to MCC/MNC entries in a system table of the enhanced PRL. Thus, when a mapped SID/NID is subsequently acquired, there is a high probability that the terminal device can camp on the acquired system—even if the enhanced PRL does not specifically include that SID/NID. This can occur, for example, when an enhanced PRL includes only MCC/MNC entries or when SID/NID entries in an enhanced PRL are not superseded by an MCC/MNC entry in the enhanced PRL.

The flowchart 300 starts in step 301 with foreground scanning and creation of a current scan list in step 303. These steps are similar to step 201 and step 203 from FIG. 2. Step 306 selects a channel from the current scan list, and the CDMA transceiver 180 (shown in FIG. 1) scans the specified channel frequency. Generally, scan lists are ordered according to a priority. The first channel selected is the most desirable channel and subsequent loops through step 306 descend through the priority order. If step 310 determines a SYNCH channel was acquired during the scanning in step 306, step 320 determines if a SID/NID included on the acquired SYNCH channel matches a SID/NID entry on a system table of an enhanced PRL 150 (shown in FIG. 1). If there is a SID/NID match, step 360 checks if the matching SID/NID is for a most preferred system according to a GEO group in the enhanced PRL. A GEO group is a logical group of systems within the system table part of the enhanced PRL. GEO is short for geographic area. Systems that are known to be in a particular geographic area (i.e., co-located) are placed in the same GEO group in the PRL. Additionally, systems within each GEO group can have different priority levels. The highest priority systems are called "most preferred" (typically these are home systems), and any lower than "most preferred" are "less preferred" (typically roam systems). If the system is most preferred, then step 383 will cause the terminal device to camp on the system. Steps 301, 303, 306, 310, 320, 360, and 383 are similar to steps 201, 203, 206, 210, 220, 260, and 283 from FIG. 2 described in more detail above and not repeated here.

If the acquired system is not a most preferred system according to the GEO group in the enhanced PRL and determined by step 360, step 362 puts channel information for the acquired system, such as frequency and band, on a SYS_AVAIL list. Next, step 364 determines if the current scan list (obtained at step 303) was obtained from the GEO group in the enhanced PRL. If the current scan list was obtained from the GEO group, the flow returns to step 306 to select a next channel from the current scan list. If the current scan list was not obtained from the GEO group, step 367 obtains a (new) current scan list that includes channels from the GEO group. Then, when the flow returns to step 306, the first channel from the (new) current scan list is selected. If the foreground scanning step 301 occurs when the terminal device 100 first powers up, the current scan list will include all the channels on the acquisition table of the enhanced PRL. After the terminal device 100 finds a system that is listed in a system table of the enhanced PRL, the scan list may change to direct scanning only for channels that match that GEO group's systems. Then, if a system is subsequently lost, the scan list will already be set to scan only for systems in the GEO group.

Returning to step 320, if the SID/NID on the acquired SYNCH channel does not match a SID/NID entry on a system table of the enhanced PRL 150 (shown in FIG. 1), step 370 determines if the SID/NID is mapped to an MCC/MNC entry in the enhanced PRL as augmented. The mapping process for an augmented enhanced PRL will be described later with reference to step 350 and step 351 and FIG. 4. If the SID/NID is mapped to an MCC/MNC (i.e., the acquired SID/NID is listed in the augmented portion of the augmented enhanced PRL), step 375 acquires the paging channel related to the acquired SYNCH channel and obtains the Extended System Parameter Message (ESPM), which is an overhead message transmitted periodically on a paging channel. Step 380 determines if the MCC/MNC from the ESPM matches an MCC/MNC on a system table of the enhanced PRL. If there is an MCC/MNC match, step 382 checks if the system is a most preferred system. If the system is a most preferred system, step 383 camps the terminal device on the acquired system. If the system is not a most preferred system, step 387 places channel information for the acquired system on the MCC_MNC_AVAIL list, with the highest priority system first, before going to step 330.

If step 380 finds that the MCC/MNC from the ESPM does not match an MCC/MNC on a system table of the enhanced PRL, step 386 removes the acquired SID/NID from the augmented enhanced PRL before going to step 330. Step 386 is most likely to occur when a network operator reconfigures its system, such as when portions of a system are upgraded or sold. If a system configuration is stable, its SID/NID to MCC/MNC mapping should also be stable.

Returning to step 370, if the acquired SID/NID is not mapped to an MCC/MNC in the augmented enhanced PRL, step 326 inserts channel information, such as frequency and band, of the acquired system at the end of the MCC_MNC_AVAIL list. Next, step 330 determines if all channels on the current scan list have been scanned. (The flow from step 310 also goes to step 330.) If not all channels on the current scan list have been scanned, the flow returns to step 306 to select the next channel from the current scan list and proceed as previously described.

If step 330 determines that all channels on the current scan list have been scanned (and no SID/NID on an acquired SYNCH channel matches a most preferred SID/NID entry on a system table of the enhanced PRL, and no MCC/MNC on an acquired paging channel matches a most preferred MCC/MNC entry on the enhanced PRL), then step 340 determines if the MCC_MNC_AVAIL list is empty. If the MCC_MNC_AVAIL list is not empty, step 346 scans the first channel on the MCC_MNC_AVAIL list. Note that this SYNCH channel was recently acquired in step 310. Step 346 then acquires the related paging channel and receives the Extended System Parameter Message (ESPM), which is an overhead message transmitted periodically on a paging channel.

Step 350 determines whether the MCC/MNC from the paging channel ESPM matches an MCC/MNC entry in a system table of the enhanced PRL. If there is no MCC/MNC match, step 358 removes the acquired frequency channel from the MCC_MNC_AVAIL list, and the flow returns to step 340. If there is an MCC/MNC match, step 351 adds the SID/NID to the augmented portion of the augmented enhanced PRL. In this second embodiment, the SID/NID in the augmented portion is associated with an MCC/MNC in a system table of the enhanced PRL as shown in FIG. 4.

Turning briefly to FIG. 4, a system table of an enhanced PRL is shown as list 410 and includes both SID/NIDs 411 and MCC/MNCs 415. An augmented portion 470 maps one or more additional SID/NIDs 476 to an MCC/MNC 416. See also SID/NIDs 478 mapped to MCC/MNC entry 418. Thus, an augmented enhanced PRL 400 is created by mapping SID/NID entries to related MCC/MNC entries on the enhanced PRL.

After the SID/NID is added to the augmented portion of the augmented enhanced PRL, step 355 determines if the matching MCC/MNC is for a most preferred system. If the matching MCC/MNC is for a most preferred system, then step 383 camps the terminal device on the acquired MCC/MNC system. If the matching MCC/MNC is not for a most preferred system, channel information is put on the CH_AVAIL list as step 357, and step 358 removes the acquired channel from the MCC_MNC_AVAIL list before returning to step 340.

If step 340 determines that the MCC_MNC_AVAIL list is empty, step 390 determines if the SYS_AVAIL list is empty. If the SYS_AVAIL list is not empty, then step 395 camps the terminal device on the highest priority system on the SYS_AVAIL list. This system could be identified through either SID/NID via step 362 or MCC/MNC via step 357. If the SYS_AVAIL list is empty, then the flow begins again at step 303 with a new current scan list that includes all the channels on the acquisition table of the enhanced PRL.

The mapping of a SID/NID to an MCC/MNC creates an augmented enhanced PRL potentially including (duplicative) SID/NID entries that are not on the enhanced PRL because they are superseded by MCC/MNC entries. Because a SID/NID takes only tens of milliseconds to acquire from a SYNCH channel while an MCC/MNC takes up to 2 seconds to acquire from a paging channel, having an augmented enhanced PRL allows the terminal device to prioritize channels based on whether a quickly-obtained SID/NID is (1) directly on the enhanced PRL, or (2) has previously been shown to be covered by an MCC/MNC on the enhanced PRL, or (3) has not previously been shown to be covered by an MCC/MNC on the enhanced PRL.

If the acquired SID/NID is directly on the enhanced PRL, step 320 will flow directly to step 360 and to step 383 if the acquired system is most preferred. If the acquired SID/NID is on the augmented enhanced PRL (but not directly on the enhanced PRL), the flow follows decision step 320 to steps 370, 375, and 380 before reaching step 383 if the acquired system is most preferred. Step 370 inquires as to whether the acquired SID/NID is on the augmented enhanced PRL. If so, then there is a high probability that the MCC/MNC to be acquired will be on the enhanced PRL. If, however, a network configuration change has affected this acquired SID/NID, step 386 removes the acquired SID/NID from the augmented enhanced PRL.

If an acquired SID/NID is not on the augmented enhanced PRL, as determined by step 370, step 326 uses an MCC_MNC_AVAIL list to record and prioritize frequency channels where the terminal device should take the time to acquire an MCC/MNC. If any SID/NID or MCC/MNC are not for a most preferred system, steps 362, 357, and 387 create a SYS_AVAIL list to keep track of acquired systems that are not most preferred. Then, if a most preferred system is not acquired, step 395 can select a best less preferred system from the SYS_AVAIL list.

This second embodiment also takes advantage of the quick acquisition time of a SID/NID from a SYNCH channel and the fact that many enhanced PRLs will include SID/NID entries in addition to (or instead of) MCC/MNC entries. Additionally, this second embodiment augments an enhanced PRL by adding a mapping of SID/NIDs covered by an MCC/MNC entry to the enhanced PRL. If an enhanced PRL only contained MCC/MNC entries, a traditional terminal device would acquire a SYNCH channel, acquire the related paging channel, and check for a match of the acquired MCC/MNC with the enhanced PRL. If there is no MCC/MNC match, the traditional terminal device would go through the same procedure with the next priority frequency channel. This process could take up to 2 seconds for acquiring each MCC/MNC. By creating an augmented enhanced PRL by matching previously-acquired SID/NIDs to MCC/MNC entries on the enhanced PRL, the terminal device (such as the terminal device 100 shown in FIG. 1) can first take the time to acquire MCC/MNCs for frequency channels which have previously been shown to match an MCC/MNC in the enhanced PRL before trying to acquire MCC/MNCs for other frequency channels. Other frequency channels are put onto an MCC_MNC_AVAIL list for further investigation as needed.

Figure 5:
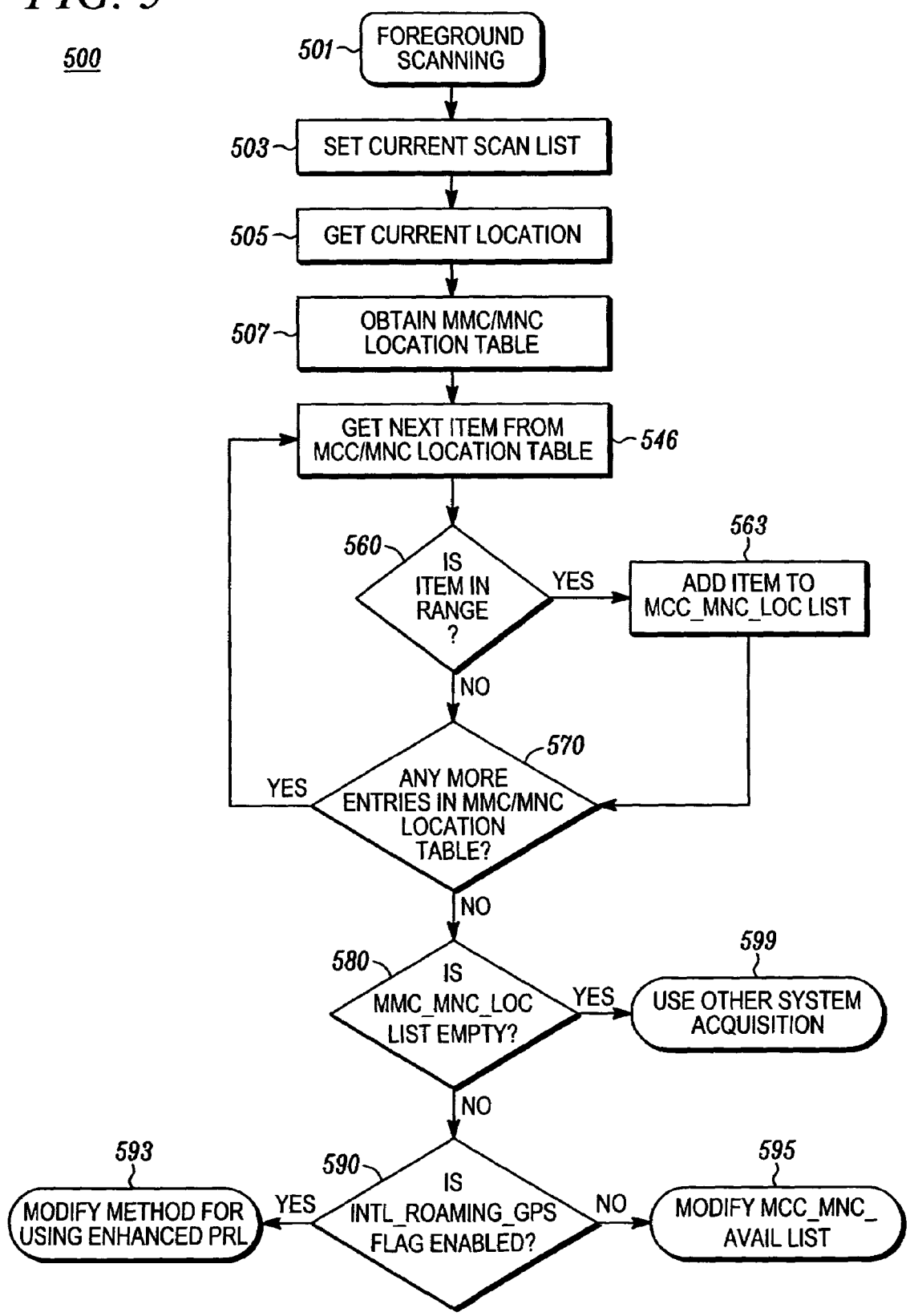
FIG. 5 shows a flowchart for using an enhanced preferred roaming list in a terminal device according to a third embodiment.

FIG. 5 shows a flowchart 500 for using an enhanced PRL list in a terminal device for international roaming according to a third embodiment. This flowchart 500 can be implemented using software in the microprocessor 160 of the terminal device 100 shown in FIG. 1. If the terminal device 100 can receive or determine its approximate geographic location, this third embodiment can be combined with the first embodiment (shown in FIG. 2) or the second embodiment (shown in FIG. 3) to further decrease the time it takes for the terminal device 100 to camp on a system.

The flowchart 500 start in step 501 with foreground scanning and selection of a current scan list in step 503. Step 505 gets the current location. The current location can be obtained through use of a GPS or other geographic positioning receiver that is included in the terminal device or connected to the terminal device (e.g., an accessory or a host). Alternately, a user of the terminal device 100 can enter the current location through the user interface 130 shown in FIG. 1.

Next, step 507 obtains a mapping of MCC/MNCs on the enhanced PRL to geographic locations, called a MCC/MNC Location table. A sample MCC/MNC Location table 600 is shown in FIG. 6. This table maps MCC/MNCs 620 to geographic locations 640. Because MCC/MNCs cover broad geographic locations (i.e., a single MCC refers to a system implementation in a country), the MCC/MNC Location table can be quite general. For example, an MCC/MNC Location table 600 can map MCC/MNC entries to geographic continents (Europe, Africa, North America, South America, Asia, Australia, etc.) rather than specific countries. Alternately, the MCC/MNC Location table can map MCC/MNC entries to a circular geographic location described by a center (latitude/longitude) and a radius. Of course, more detailed mappings can be created, transmitted, and stored as resources allow.

Returning to FIG. 5, step 546 takes the first item from the MCC/MNC Location table and step 560 determines if the current location of the terminal device is within the geographic boundaries defined by that item. If step 560 determines that the terminal device is within range, step 563 adds the MCC/MNC of that item to a MCC_MNC_LOC list. Step 570 continues going through the MCC/MNC Location table until the flow has reached the end of the MCC/MNC Location table and built a complete MCC_MNC_LOC list of all MCC/MNCs on the enhanced PRL that correspond to the current location of the terminal device.

Step 580 determines if the MCC_MNC_LOC list is empty. If the MCC_MNC_LOC list is not empty, that means that the MCC/MNC entries on the MCC_MNC_LOC list have a higher probability of success with regard to the terminal device being able to camp on that system.

The MCC_MNC_LOC list can be used to modify the flowcharts for using an enhanced preferred roaming list such as those shown in FIG. 2 and FIG. 3. For example, in situations where a PRL has only SID/NID entries for one geographic region and only MCC/MNC entries for another, non-overlapping geographic region, the procedure for camping on a system could be modified to take advantage of this non-overlap. Step 590 determines if a INTL_ROAMING_GPS flag in nonvolatile memory of a terminal device is enabled or set to "true." If the flag is enabled, step 593 would modify the flowcharts shown in FIG. 2 and FIG. 3 so that the terminal device would use only seek to acquire SID/NID's from channels when the device is in a particular geographic location and only seek to acquire MCC/MNC's from channels when the device is outside that particular geographic location.

If the flag is not enabled or is set to "false," step 595 modifies the MCC_MNC_AVAIL list to reflect a higher probability of being able to camp on a system with an MCC/MNC on the MCC_MNC_LOC list. By using the mapping of MCC/MNC entries to SID/NID entries in an augmented portion of an augmented enhanced PRL (see FIG. 4), the SID/NID entries on the MCC_MNC_AVAIL list can be prioritized according to the MCC_MNC_LOC list entries. In one implementation, SID/NID entries on the MCC_MNC_AVAIL list that correspond to MCC/MNC entries on the MCC_MNC_LOC list are given a higher priority than SID/NID entries that do not correspond to MCC/MNC entries on the MCC_MNC_LOC list. In another implementation, SID/NID entries that do not correspond to MCC/MNC entries on the MCC_MNC_LOC list are deleted from the MCC_MNC_AVAIL list.

If the MCC_MNC_LOC list is empty, having the current location of the terminal device has not benefited the system acquisition process, and the terminal device can use traditional scanning to find a system or can use either the first embodiment (shown in FIG. 2) or second embodiment (shown in FIG. 3) to find a system on which to camp in step 599.

Thus, the terminal device uses an enhanced preferred roaming list (enhanced PRL) for international roaming in various ways to allow for quicker acquisition times. By first scanning for SID/NID entries in the enhanced PRL, the terminal device takes advantage of quick SID/NID acquisition times and defers the longer MCC/MNC acquisition times to situations where no acquired SID/NIDs match SID/NIDs of most preferred systems in the enhanced PRL. The terminal device can also augment the enhanced PRL by mapping SID/NIDs that are not directly on the enhanced PRL to MCC/MNCs that are on the enhanced PRL. In that case, the mobile terminal first acquires MCC/MNCs of channels that have matches of the acquired SID/NID to a mapped SID/NID and defers other MCC/MNC acquisitions to situations where no acquired SID/NID is directly on the enhanced PRL as a most preferred system or is mapped to an MCC/MNC entry on the enhanced PRL as a most preferred system. Also, geographic location information can be used to help prioritize the order in which MCC/MNCs should be acquired during those situations where no SID/NID matches occurred either to the enhanced PRL directly or through an augmented enhanced PRL as a most preferred system.

While this disclosure includes what are considered presently to be the preferred embodiments and best modes of the invention described in a manner that establishes possession thereof by the inventors and that enables those of ordinary skill in the art to make and use the invention, it will be understood and appreciated that there are many equivalents to the preferred embodiments disclosed herein and that modifications and variations may be made without departing from the scope and spirit of the invention, which are to be limited not by the preferred embodiments but by the appended claims, including any amendments made during the pendency of this application and all equivalents of those claims as issued.

It is further understood that the use of relational terms such as first and second, top and bottom, and the like, if any, are used solely to distinguish one from another entity, item, or action without necessarily requiring or implying any actual such relationship or order between such entities, items or actions. Much of the inventive functionality and many of the inventive principles are best implemented with or in software programs or instructions. It is expected that one of ordinary skill, notwithstanding possibly significant effort and many design choices motivated by, for example, available time, current technology, and economic considerations, when guided by the concepts and principles disclosed herein will be readily capable of generating such software instructions and programs with minimal experimentation. Therefore, further discussion of such software, if any, will be limited in the interest of brevity and minimization of any risk of obscuring the principles and concepts according to the present invention.

We claim:

1. A method in a terminal device for acquiring a system identified in a roaming list with at least one entry containing a mobile country code, the method comprising the steps of:
   (a) obtaining a first system identifier from a first channel;
   (b) determining if the first system identifier matches an entry on the roaming list;
   (c) inserting a first channel information item of the first channel on a first list if the first system identifier does not match an entry on the roaming list;
   (d) obtaining an initial mobile country code using an initial channel information item from the first list;
   (e) determining if the initial mobile country code matches an entry on the roaming list, after obtaining an initial mobile country code; and
   (f) camping on a system of the initial channel information item if the initial mobile country code matches an entry on the roaming list.

2. A method according to claim 1 further comprising, after step (e), the step of:
   removing the initial channel information item from the first list if the initial mobile country code does not match an entry on the roaming list.

3. A method according to claim 1 further comprising, before step (d), the steps of:
   (a') obtaining a next system identifier from a next channel;
   (b') determining if the next system identifier matches an entry on the roaming list; and
   (c') inserting a next channel information item of the next channel on the first list if the next system identifier does not match an entry on the roaming list.

4. A method according to claim 3 wherein the steps of (a') obtaining, (b') determining, and (c') inserting are repeated for further channels.

5. A method according to claim 3 further comprising, after step (c'), the steps of:
   (d') obtaining a subsequent mobile country code using a subsequent channel information item from the first list;
   (e') determining if the subsequent mobile country code matches an entry on the roaming list; and
   (f') camping on a system of the subsequent channel information item if the subsequent mobile country code matches an entry on the roaming list.

6. A method according to claim 5 wherein the steps of (d') obtaining, (e') determining, and (f') camping are repeated for other mobile country codes using other channel information items from the first list.

7. A method according to claim 5 further comprising, after step (e'), the step of:
   removing the subsequent channel information item from the first list if the subsequent mobile country code does not match an entry on the roaming list.

8. A method according to claim 1 further comprising, after step (e), the step of:
   if the initial mobile country code matches an entry on the roaming list, linking an initial system identifier, which is related to the initial channel information item, to the roaming list to create an augmented roaming list.

9. A method according to claim 8 wherein step (b) includes the step of determining if the first system identifier matches an entry on the augmented roaming list.

10. A method according to claim 9 further comprising the steps of:
    if the first system identifier matches an entry on the augmented roaming list:
       obtaining a further mobile country code using the first channel;
       determining if the further mobile country code matches an entry on the roaming list; and
       camping on a system of the first channel if the further mobile country code matches an entry on the roaming list.

11. A method according to claim 10 further comprising the step of:
    removing the entry from the augmented roaming list that matches the first system identifier if the further mobile country code does not match an entry on the roaming list.

12. A method according to claim 1 further comprising the steps of:
    before step (a):
       getting a current geographic location of the terminal device;
       obtaining a table that maps mobile country codes in the roaming list to geographic ranges; and
       creating a location list of mobile country codes with geographic ranges that encompass the current geographic location of the terminal device.

13. A method according to claim 12 further comprising the step of:
    before step (d):
    arranging the first list to give a higher priority to channel information items that correspond to mobile country codes on the location list.

14. A method according to claim 12 further comprising the step of:
    before step (d):
    deleting items from the first list that do not correspond to mobile country codes on the location list.

15. A method according to claim 1 further comprising, after step (b), the steps of:
    determining if the first system identifier is for a most preferred system; and
    camping on a system of the first system identifier if the first system identifier is for a most preferred system.

16. A method according to claim 15 further comprising the steps of:

putting the first channel information item on a second list if the first system identifier is not for a most preferred system.

17. A method for an electronic device having a roaming list, the method comprising the steps of:

scanning a first channel using a first sequence of steps to acquire a first identifier;

if the first identifier does not match a most preferred system identifier on the roaming list scanning a second channel using the first sequence of steps to acquire a second identifier;

if the second identifier does not match a most preferred system identifier on the roaming list scanning the first channel using a second sequence of steps that requires more time than the first sequence of steps to acquire a third identifier; and if the third identifier does not match a most preferred system identifier on the roaming list scanning the second channel using the second sequence of steps to acquire a fourth identifier.

18. A method according to claim 17 wherein the first sequence of steps comprises:

acquiring a system identifier.

19. A method according to claim 17 wherein the second sequence of steps comprises:

acquiring a mobile country code.

20. A terminal device comprising:

a receiver;

a memory with a current scan list and a roaming list containing at least one mobile country code; and a controller, coupled to the receiver and the memory, configured to:

direct the receiver to scan a first channel listed in the current scan list to obtain a first system identifier;

place a first channel information item of the first channel on a list, if the first system identifier is not on the roaming list;

direct the receiver to scan a second channel listed in the current scan list to obtain a second system identifier;

place a second channel information item of the second channel on the list, if the second system identifier is not on the roaming list;

direct the receiver to use an initial channel information item to obtain an initial mobile country code, after placing the first channel information item of the first channel on the list; and direct the receiver to use a subsequent channel information item to obtain a subsequent mobile country code, if the initial mobile country code is not on the roaming list.

* * * * *